US012695085B2

(12) United States Patent
Lai et al.

(10) Patent No.: US 12,695,085 B2
(45) Date of Patent: Jul. 28, 2026

(54) COMPOSITE CATHODE FOR SOLID-STATE BATTERY

(71) Applicants:HON HAI PRECISION INDUSTRY CO., LTD., New Taipei City (TW); SolidEdge Solution Inc., Hsinchu City (TW)

(72) Inventors: Hong-Zheng Lai, Hsinchu City (TW); Chih-Ching Chang, Hsinchu City (TW); Tseng-Lung Chang, Hsinchu City (TW)

(73) Assignees: HON HAI PRECISION INDUSTRY CO., LTD., New Taipei City (TW); SolidEdge Solution Inc., Hsinchu City (TW)

( * ) Notice: Subject to any disclaimer, the term of this patent is extended or adjusted under 35 U.S.C. 154(b) by 699 days.

(21) Appl. No.: 18/074,809

(22) Filed: Dec. 5, 2022

(65) Prior Publication Data

US 2023/0335720 A1     Oct. 19, 2023

(30) Foreign Application Priority Data

Apr. 14, 2022     (TW) ................................. 111114323

(51) Int. Cl.
| | |
|---|---|
| *H01M 4/36* | (2006.01) |
| *H01M 4/02* | (2006.01) |
| *H01M 4/13* | (2010.01) |
| *H01M 4/62* | (2006.01) |
| *H01M 10/0525* | (2010.01) |
| *H01M 10/0562* | (2010.01) |

(52) U.S. Cl.
CPC ............. *H01M 4/366* (2013.01); *H01M 4/13* (2013.01); *H01M 4/62* (2013.01); *H01M 10/0525* (2013.01); *H01M 10/0562* (2013.01); *H01M 2004/021* (2013.01); *H01M 2004/028* (2013.01); *H01M 2300/0071* (2013.01)

(58) Field of Classification Search
CPC .......... H01M 4/13; H01M 4/366; H01M 4/62; H01M 10/052; H01M 10/0525; H01M 10/056; H01M 10/0562; H01M 10/0565; H01M 10/4235
See application file for complete search history.

(56) References Cited

U.S. PATENT DOCUMENTS

| | | | |
|---|---|---|---|
| 2020/0403267 A1 | 12/2020 | Li et al. | |
| 2021/0167356 A1* | 6/2021 | Ma ....................... | C01G 35/006 |
| 2021/0408591 A1* | 12/2021 | Badding ............. | H01M 10/056 |

FOREIGN PATENT DOCUMENTS

| | | |
|---|---|---|
| CN | 110556575 A | 12/2019 |
| CN | 111512487 A | 8/2020 |
| CN | 112599850 A | 4/2021 |
| EP | 3364489 A1 | 8/2018 |

(Continued)

*Primary Examiner* — Karie O'Neill Apicella
(74) *Attorney, Agent, or Firm* — CKC & Partners Co., LLC

(57) ABSTRACT

The disclosure provides a composite cathode for a solid-state battery, which includes a composite layer and a solid electrolyte layer. The composite layer includes a cathode sheet, an interface layer and an ion conductor. The interface layer is disposed on the cathode sheet. The ion conductor is disposed between the cathode sheet and the interface layer, or dispersed in the cathode sheet and the interface layer. The solid electrolyte layer is disposed on the composite layer.

16 Claims, 2 Drawing Sheets

<u>100</u>

(56)  References Cited

FOREIGN PATENT DOCUMENTS

| EP | 3691013 | A1 | 8/2020 |
| EP | 3940836 | A1 | 1/2022 |
| TW | 201547090 | A | 12/2015 |
| TW | 201944644 | A | 11/2019 |

* cited by examiner

100

120

114

116   110

112

COMPOSITE CATHODE FOR SOLID-STATE BATTERY

CROSS-REFERENCE TO RELATED APPLICATION

This application claims priority to Taiwan Application Serial Number 111114323, filed on Apr. 14, 2022, which is herein incorporated by reference.

BACKGROUND

Field of Invention

The present disclosure relates to a composite cathode for a solid-state battery, and more particularly, to a composite cathode for a solid-state battery that can enhance ionic conductivity and improve interface impedance.

Description of Related Art

Solid-state batteries have become more and more advanced in recent years and may be the ideal battery for future electric vehicles. The main factor is that the solid-state batteries have a higher energy density than the commonly used lithium-ion batteries.

The biggest difference between solid-state batteries and lithium-ion batteries is that solid-state batteries use solid electrolytes. Solid-state batteries are safer because they do not contain liquid electrolytes.

However, the current solid-state batteries usually suffer from poor contact or high interfacial resistance at a solid-solid interface due to the solid-state structure. This makes it more difficult to mass-produce solid-state batteries and cannot be industrialized as quickly as lithium-ion batteries. The current way to improve poor contact or high interfacial resistance in the solid-state batteries is usually to pressurize the solid electrolyte and the cathode material, etc., or to modify the solid electrolyte formulation to reduce the chance of short circuiting. However, the extent of improvement in this way is really limited, so there is an urgent need for a product that can fundamentally improve poor contact or high interfacial resistance in the solid-state batteries.

SUMMARY

The present disclosure provides a composite cathode for a solid-state battery, which includes a composite layer and a solid electrolyte layer. The composite layer includes a cathode sheet, an interface layer and an ion conductor. The interface layer is disposed on the cathode sheet. The ion conductor is disposed between the cathode sheet and the interface layer, or dispersed in the cathode sheet and the interface layer. The solid electrolyte layer is disposed on the interface layer of the composite layer.

In some embodiments, the interface layer includes a plasticized polymer, an adhesive polymer and a lithium salt.

In some embodiments, the plasticized polymer includes poly(methyl methacrylate) (PMMA), polymethylacrylate (PMA), poly(acrylic acid) (PAA) or a combination thereof.

In some embodiments, the adhesive polymer includes polyvinylidene difluoride (PVDF), poly(vinylidene fluoride)-co-hexafluoropropylene (PVDF-HFP), polyvinyl alcohol (PVA), polylactic acid (PLA), polyethylene glycol (PEG), or a combination thereof.

In some embodiments, the lithium salt includes lithium fluoride (LiF), lithium bis(fluorosulfonyl)imide (LiFSI), lithium bis(trifluoromethanesulfonyl)imide (LiTFSI), lithium bis(pentafluoroethanesulfonyl)imide (LiBETI), lithium bis(oxalato)borate (LiBOB), or a combination thereof.

In some embodiments, the ion conductor includes an ionic liquid, which includes 1-ethyl-2,3-trimethyleneimidazolium bis(trifluoromethanesulfonyl)imide, 1-propyl-3-methylimidazolium bis(trifluoromethylsulfonyl)imide, N-methyl-N-propylpiperidinium bis(trifluoromethanesulfonyl)imide, N-butyl-N-methyl pyrrolidinium bis(trifluoromethanesulfonyl)-N-cyanoamide, 1,2-dimethyl-3-propylimidazolium bis (trifluoromethanesulfonyl)imide or a combination thereof.

In some embodiments, the solid electrolyte layer includes a plasticized polymer, an adhesive polymer, a lithium salt and a solid electrolyte, and a weight ratio of the lithium salt, the adhesive polymer, the plasticized polymer and the solid electrolyte is 16-25:26-34:5-20:10-40.

In some embodiments, the solid electrolyte includes $Li_{7-(3x-y-3z)}Ga_xAl_yFe_zLa_3Zr_2O_{12}$, $Li_7La_3Zr_{(2-a-b-c-d-e)}Ta_aNb_bGd_cTe_dW_eO_{12}$, $Li_7La_{(3-m-n)}Ce_mSr_nZr_2O_{12}$, $Li_{1.4}Al_{0.4}Ti_{1.6}(PO_4)_3$, or a combination thereof, in which a, b, c, d and e are each independently 0.20 to 0.60, and m and n are each independently 0.10 to 0.50, and x, y and z are each independently 0.10 to 0.40.

In some embodiments, the plasticized polymer includes poly(methyl methacrylate), polymethylacrylate, poly (acrylic acid), or a combination thereof.

In some embodiments, the adhesive polymer includes polyvinylidene difluoride, poly(vinylidene fluoride)-co-hexafluoropropylene, polyvinyl alcohol, polylactic acid, polyethylene glycol, or a combination thereof.

In some embodiments, the lithium salt includes lithium fluoride, lithium bis(fluorosulfonyl)imide, lithium bis(trifluoromethanesulfonyl)imide, lithium bis(pentafluoroethanesulfonyl)imide, lithium bis(oxalato)borate, or a combination thereof.

In some embodiments, a thickness of the cathode sheet is in a range from 1 μm to 500 μm.

In some embodiments, a thickness of the interface layer is in a range from 0.1 μm to 1 μm.

In some embodiments, a thickness of the solid electrolyte layer is in a range from 1 μm to 50 μm.

In some embodiments, when the ion conductor is disposed between the cathode sheet and the interface layer, the ion conductor has a thickness in a range from 0.1 μm to 1 μm.

In some embodiments, when the ion conductor is dispersed in the cathode sheet and the interface layer, the ion conductor has a concentration in a range from 0.01 M to 10 M.

The present disclosure also provides a solid-state battery, which includes a composite cathode and an anode. The composite cathode includes a composite layer and a solid electrolyte layer. The composite layer includes a cathode sheet, an interface layer and an ion conductor. The interface layer is disposed on the cathode sheet. The ion conductor is disposed between the cathode sheet and the interface layer, or dispersed in the cathode sheet and the interface layer. The solid electrolyte layer is disposed on the interface layer of the composite layer. The anode is disposed on the solid electrolyte of the composite cathode and electrically connected to the composite cathode by a circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

In order to make the description of the present disclosure more detailed and complete, aspects and specific embodiments of the present disclosure are described in detail below; but these are not the only form of implementing or using the specific embodiments of the present disclosure. The embodiments disclosed below can be combined or substituted with each other under beneficial circumstances, and other embodiments can also be added to one embodiment without further description.

As used herein, "comprise", "include" "have", and similar terms as used herein indicate described features, regions, integers, steps, operations, elements and/or components, but not exclude other features, regions, integers, steps, operations, elements, components and/or groups.

A composite cathode of the present disclosure can be used in any solid-state lithium-ion battery. The present disclosure significantly reduces interfacial impedance and improves lithium ionic conductivity of the active materials by arranging an interface layer between a solid electrolyte and a cathode sheet.

In one embodiment, when the composite cathode described in the present disclosure is installed in a solid-state battery, an anode is disposed on a side of the composite cathode with the solid electrolyte, and the cathode sheet is electrically connected to the anode sheet by a circuit.

Figure 1:
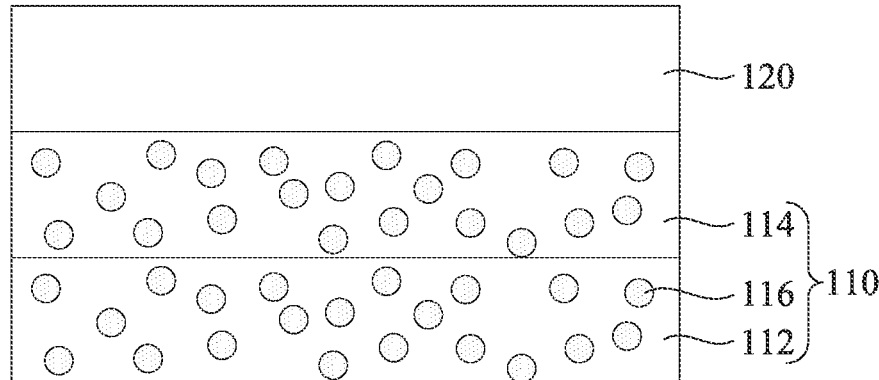
FIG. 1 is a schematic cross-sectional view of an ion conductor of a composite cathode dispersed in a cathode sheet and an interface layer according to some embodiments of the present disclosure.

In some embodiments, please first refer to FIG. 1, which shows a schematic cross-sectional view of an ion conductor of a composite cathode dispersed in a cathode sheet and an interface layer according to some embodiments of the present disclosure. The present disclosure provides a composite cathode 100 including a composite layer 110 and a solid electrolyte layer 120. The composite layer 110 includes a cathode sheet 112, an interface layer 114 and an ion conductor 116. The interface layer 114 is disposed on the cathode sheet 112. The ion conductor 116 is dispersed in the cathode sheet 112 and the interface layer 114. The solid electrolyte layer 120 is disposed on the interface layer 114 of the composite layer 110. The materials or preparation methods of the cathode sheet 112, the interface layer 114 and the solid electrolyte layer 120 are described below.

In some embodiments, a thickness of the cathode sheet 112 is in a range from 1 μm to 500 μm, with thicker cathode sheet thickness being beneficial for improving the energy density of a cell. In one embodiment, the thickness of the cathode sheet 112 may be, but not limited to, 50 μm, 100 μm, 200 μm, 300 μm, 400 μm, or any value therebetween.

In some embodiments, the materials used for preparing the interface layer 114 include a plasticized polymer, an adhesive polymer, a lithium salt, and a solvent.

In some embodiments, the plasticized polymer used for preparing the interface layer 114 is in the form of solid particles, which includes poly(methyl methacrylate) (PMMA), polymethylacrylate (PMA), poly(acrylic acid) (PAA), or a combination thereof. The plasticized polymer is mainly used to enable the interface layer 114 to be formed.

In some embodiments, the adhesive polymer used for preparing the interface layer 114 is in powder form and of a material including polyvinylidene difluoride (PVDF), poly (vinylidene fluoride)-co-hexafluoropropylene (PVDF-HFP), polyvinyl alcohol (PVA), polylactic acid (PLA), polyethylene glycol (PEG), or a combination thereof. In some embodiments, polyethylene glycol includes, but is not limited to, di-polyethylene glycol (DIPEG). In some embodiments, di-polyethylene glycol includes, but is not limited to, sulfonated polyphenyl di-polyethylene glycol. The adhesive polymer is mainly used to enable the interface layer 114 to be firmly and tightly adhered to the cathode sheet 112 and the solid electrolyte layer 120 sequentially formed on the interface layer 114.

In some embodiments, the lithium salt used for preparing the interface layer 114 is in powder form and of a material including lithium fluoride (LiF), lithium bis(fluorosulfonyl) imide (LiFSI), lithium bis(trifluoromethanesulfonyl)imide (LiTFSI), lithium bis(pentafluoroethanesulfonyl)imide (Li-BETI), lithium bis(oxalato)borate (LiBOB), or a combination thereof. In one embodiment, the lithium salt of the interface layer 114 can improve the ionic conductivity between the cathode sheet 112 and the solid electrolyte layer 120, while reducing impedance and reducing the chance of short circuiting.

In some embodiments, the solvent for dissolving the plasticized polymer, the adhesive polymer and the lithium salt includes N-methylpyrrolidone (NMP), N,N-dimethylacetamide (DMAC), tetrahydrofuran (THF), or a combination thereof. It is to be noted that the solvent is removed after baking and drying and does not exist with the interface layer 114 in the composite cathode 100 of the present disclosure.

In some embodiments, a thickness of the interface layer 114 is in a range from 0.1 μm to 1 μm to improve the efficiency of lithium ion conduction and to avoid internal short circuits.

In some embodiments, the ion conductor 116 dispersed in the cathode sheet 112 and the interface layer 114 is formed by doping the ion conductor 116 when the cathode sheet 112 and the interface layer 114 are prepared. It should be noted that the ion conductor 116 can be dispersed and directly doped in the cathode sheet 112 and the interface layer 114 as shown in FIG. 1 for reference, or it can be disposed between the cathode sheet 112 and the interface layer 114. The addition of the ion conductor 116 can help the conduction efficiency of the lithium ions and achieve an effect of high current discharge.

In some embodiments, when the ion conductor 116 is dispersed in the cathode sheet 112 and the interface layer 114, a concentration of the ion conductor 116 is in a range from 0.01 M to 10 M.

In some embodiments, the ion conductor 116 includes an ionic liquid, which includes 1-ethyl-2,3-trimethyleneimidazolium bis(trifluoromethanesulfonyl)imide, 1-propyl-3-methylimidazolium bis(trifluoromethylsulfonyl)imide, N-methyl-N-propylpiperidinium bis(trifluoromethanesulfonyl)imide, N-butyl-N-methyl pyrrolidinium bis(trifluoromethanesulfonyl)-N-cyanoamide, 1,2-dimethyl-3-propylimidazolium bis(trifluoromethanesulfonyl)imide, or a combination thereof.

Still referring to FIG. 1, the solid electrolyte layer 120 is disposed on the interface layer 114 of the composite layer 110. In some embodiments, the materials used for preparing the solid electrolyte layer 120 include a plasticized polymer, an adhesive polymer, a lithium salt, and a solid electrolyte, and a weight ratio of the lithium salt, the adhesive polymer, the plasticized polymer, and the solid electrolyte is preferably 16-25:26-34:5-20:10-40 (e.g., parts by weight) to improve the ionic conductivity and avoid weakening of mechanical strength.

In some embodiments, the material used for preparing the solid electrolyte layer 120 includes $Li_{7-(3x-y-z)}Ga_xAl_yFe_zLa_3Zr_2O_{12}$, $Li_7La_3Zr_{(2-a-b-c-d-e)}Ta_aNb_bGd_cT-e_dW_eO_{12}$, $Li_7La_{(3-m-n)}Ce_mSr_nZr_2O_{12}$, $Li_{1.4}Al_{0.4}Ti_{1.6}(PO_4)_3$, or a combination thereof, in which a, b, c, d and e are each independently from 0.20 to 0.60, and m and n are each independently from 0.10 to 0.50, and x, y and z are each independently from 0.10 to 0.40.

In some embodiments, the plasticized polymer used for preparing the solid electrolyte layer 120 is in the form of solid particles, which includes poly(methyl methacrylate) (PMMA), polymethylacrylate (PMA), poly(acrylic acid) (PAA), or a combination thereof. The plasticized polymer is mainly used to enable the solid electrolyte layer 120 to be formed.

In some embodiments, the adhesive polymer used for preparing the solid electrolyte layer 120 is in powder form and of a material including polyvinylidene difluoride (PVDF), poly(vinylidene fluoride)-co-hexafluoropropylene (PVDF-HFP), polyvinyl alcohol (PVA), polylactic acid (PLA), polyethylene glycol (PEG), or a combination thereof. In some embodiments, the polyethylene glycol includes, but is not limited to, di-polyethylene glycol (DI-PEG). In some embodiments, di-polyethylene glycol includes, but is not limited to, sulfonated polyphenyl di-polyethylene glycol. The adhesive polymer is mainly used to enable the solid electrolyte layer 120 to be firmly and tightly adhered to the interface layer 114.

In some embodiments, the lithium salt used for preparing the solid electrolyte layer 120 is in powder form and of a material including lithium fluoride (LiF), lithium bis(fluorosulfonyl)imide (LiFSI), lithium bis(trifluoromethanesulfonyl)imide (LiTFSI), lithium bis(pentafluoroethanesulfonyl)imide (LiBETI), lithium bis(oxalato)borate (LiBOB), or a combination thereof.

In some embodiments, in the aforementioned simple preparation process, the solvent for dissolving the plasticized polymer, the adhesive polymer, the lithium salt, and the solid electrolyte includes N-methylpyrrolidone (NMP), N,N-dimethylacetamide (DMAC), tetrahydrofuran (THF), or a combination thereof. It should be noted that the solvent is removed after baking and drying, and does not exist in the composite cathode 100 of the present disclosure together with the solid electrolyte layer 120.

A thickness of the solid electrolyte layer 120 can be adjusted as needed for different battery designs to provide safety and stability and to increase energy density. In some embodiments, a thickness of the solid electrolyte layer 120 is in a range from 1 μm to 50 μm. In practice, the thickness of the solid electrolyte layer 120 can be practically adjusted to provide the desired safety, stability, and increased energy density as required by different battery designs. In one embodiment, a thickness of the solid electrolyte layer 120 may be, but is not limited to, 5 μm, 10 μm, 20 μm, 30 μm, 40 μm, or any value therebetween.

In some embodiments of the present disclosure, a preparation method for a solid-state battery is provided. In one embodiment, the cathode sheet 112 of the composite layer 110 is formed by coating a cathode material on an electrode plate, and then baking and drying in a hot air oven.

In one embodiment, a preparation process of the interface layer 114 is briefly described as follows. The powders of the lithium salt, the solid particles of the plasticized polymer, and the powders of the adhesive polymer are dissolved in the solvent to form a mixed colloid. The colloid is coated on the cathode sheet 112 and then baked and dried to remove the solvent to form the interface layer 114 used in the present disclosure. In one embodiment, the interface layer 114 is formed by coating a material in the form of colloid on the cathode sheet 112, and then baking and drying in a hot air oven. It should be noted that the processes of baking and drying the cathode sheet 112 and the interface layer 114 are used to remove the solvent used for mixing the materials.

In one embodiment, a simple preparation process of the solid electrolyte layer 120 is similar to that of the interface layer 114. The powders of the lithium salt, the solid particles of the plasticized polymer, the powders of the adhesive polymer, and the powders of the solid electrolyte are dissolved in the solvent to form a mixed colloid. The colloid is coated on the interface layer 114, and then baked and dried to remove the solvent to form the solid electrolyte layer 120 used in the present disclosure. It should be noted that the processes of baking and drying the solid electrolyte layer 120 are used to remove the solvent used for mixing the materials.

One aspect of the composite cathode 100 of the present disclosure and the properties of the materials of each structure have been described above. Accordingly, when an interface layer 114 is disposed between the cathode sheet 112 and the solid electrolyte layer 120, the interface layer 114 can increase the ionic conductivity between the cathode sheet 112 and the solid electrolyte layer 120, and thus solve the issues of ion conduction in the solid-state battery.

Figure 2:
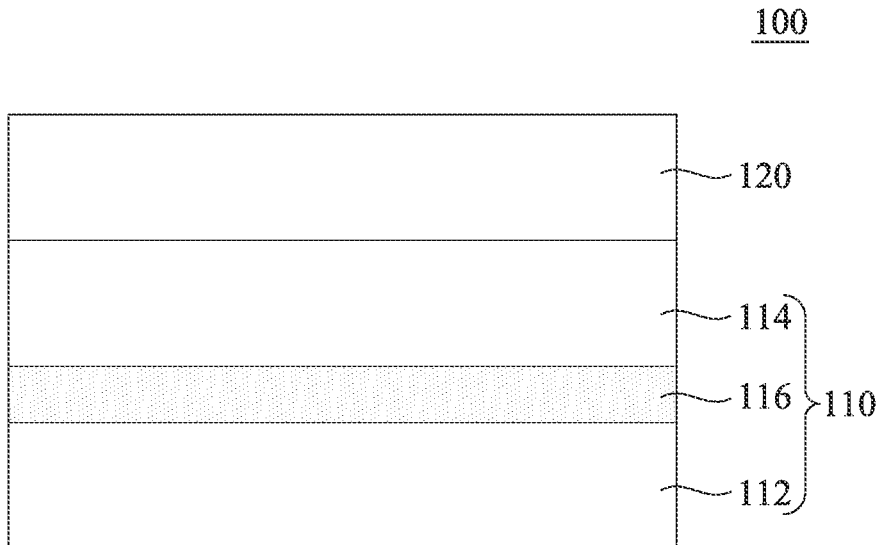
FIG. 2 is a schematic cross-sectional view of an ion conductor of a composite cathode disposed between a cathode sheet and an interface layer according to other embodiments of the present disclosure.

Referring to FIG. 2, FIG. 2 is a schematic cross-sectional view of an ion conductor of a composite cathode disposed between a cathode sheet and an interface layer according to other embodiments of the present disclosure. The composite cathode 100 includes a composite layer 110 and a solid electrolyte layer 120. The composite layer 110 includes a cathode sheet 112, an interface layer 114 and an ion conductor 116. The ion conductor 116 is disposed on the cathode sheet 112. The interface layer 114 is disposed on the ion conductor 116. Accordingly, different from the configuration shown in FIG. 1, the ion conductor 116 is provided between the cathode sheet 112 and the interface layer 114. The solid electrolyte layer 120 is disposed on the interface layer 114 of the composite layer 110.

Please note that the materials or properties of the above-mentioned layers or elements are the same as those of the embodiments described in FIG. 1, and thus will not be repeated here.

In some embodiments, when the ion conductor 116 is disposed between the cathode sheet 112 and the interface layer 114, a thickness of the ion conductor 116 is in a range from 0.1 μm to 1 μm. Accordingly, the ion conductor 116 disposed between the cathode sheet 112 and the interface layer 114 can achieve an effect of reducing interface impedance.

In some embodiments of the present disclosure, a preparation method for a solid-state battery is provided. In one embodiment, the cathode sheet 112 of the composite layer 110 is formed by coating a cathode material on an electrode plate, and then baking and drying in a hot air oven.

In one embodiment, the ion conductor 116 is coated on the cathode sheet 112 in the form of colloid. In one embodiment, the ion conductor 116 may be prepared without using a solvent, so the formation of the ion conductor 116 does not need to undergo a process of drying in a hot air oven.

In one embodiment, a preparation process of the interface layer 114 is the same as that of the embodiments described in FIG. 1, so it is not repeated here. The interface layer 114 is formed by coating a material in the form of colloid on the ion conductor 116, and then baking and drying in a hot air oven.

In one embodiment, a preparation process of the solid electrolyte layer 120 and a preparation process of the solid electrolyte layer 120 disposed on the interface layer 114 are the same as those of the embodiments described in FIG. 1, so those are not repeated here.

The other aspect of the composite cathode 100 of the present disclosure has been described above. Accordingly, when the interface layer 114 is disposed between the ion conductor 116 and the solid electrolyte layer 120, the interface layer 114 can increase the ionic conductivity of the cathode sheet 112, the ion conductor 116 and the solid electrolyte layer 120, and thus solve the issues of ion conduction in the solid-state battery.

In summary, the composite cathode of the present disclosure can be used in any solid-state lithium-ion battery. The present disclosure greatly reduces the interface impedance and improve the lithium ionic conductivity of the active materials by arranging the interface layer between the solid electrolyte and the cathode sheet. Accordingly, the present disclosure solves the issues of the solid-to-solid ionic conduction.

The foregoing outlines the features of several embodiments so that those skilled in the art may better understand various aspects of the present disclosure. Those skilled in the art will appreciate that they may readily use the present disclosure as a basis for designing or modifying other processes and structures for carrying out the same purposes and/or achieving the same benefits of the embodiments described in the present disclosure. Those skilled in the art should also understand that although the present disclosure has been disclosed above in various embodiments, it is not intended to limit the present disclosure. Anyone skilled in the art can make various changes and modifications without departing from the spirit and scope of the present disclosure. Therefore, the scope of protection of the present disclosure should be determined by the scope of the appended claims.

What is claimed is:

1. A composite cathode for a solid-state battery, comprising:
a composite layer, comprising:
a cathode sheet;
an interface layer, disposed on the cathode sheet; and
an ion conductor, disposed between the cathode sheet and the interface layer, or dispersed in the cathode sheet and the interface layer, wherein the ion conductor comprises an ionic liquid, which comprises 1-ethyl-2,3-trimethyleneimidazolium bis(trifluoromethanesulfonyl)imide, 1-propyl-3-methylimidazolium bis(trifluoromethylsulfonyl)imide, N-methyl-N-propylpiperidinium bis(trifluoromethanesulfonyl)imide, N-butyl-N-methyl pyrrolidinium bis(trifluoromethanesulfonyl)-N-cyanoamide, 1,2-dimethyl-3-propylimidazolium bis(trifluoromethanesulfonyl)imide, or a combination thereof; and
a solid electrolyte layer disposed on the interface layer of the composite layer.

2. The composite cathode of claim 1, wherein the interface layer comprises a plasticized polymer, an adhesive polymer and a lithium salt.

3. The composite cathode of claim 2, wherein the plasticized polymer comprises poly(methyl methacrylate) (PMMA), polymethylacrylate (PMA), poly(acrylic acid) (PAA), or a combination thereof.

4. The composite cathode of claim 2, wherein the adhesive polymer comprises polyvinylidene difluoride (PVDF), poly(vinylidene fluoride)-co-hexafluoropropylene (PVDF-HFP), polyvinyl alcohol (PVA), polylactic acid (PLA), polyethylene glycol (PEG), or a combination thereof.

5. The composite cathode of claim 2, wherein the lithium salt comprises lithium fluoride (LiF), lithium bis(fluorosulfonyl)imide (LiFSI), lithium bis(trifluoromethanesulfonyl)imide (LiTFSI), lithium bis(pentafluoroethanesulfonyl) imide (LiBETI), lithium bis(oxalato)borate (LiBOB), or a combination thereof.

6. The composite cathode of claim 1, wherein the solid electrolyte layer comprises a plasticized polymer, an adhesive polymer, a lithium salt and a solid electrolyte, and a weight ratio of the lithium salt, the adhesive polymer, the plasticized polymer and the solid electrolyte is 16-25:26-34:5-20:10-40.

7. The composite cathode of claim 6, wherein the solid electrolyte comprises $Li_{7-(3x-y-3z)}Ga_xAl_yFe_zLa_3Zr_2O_{12}$, $Li_7La_3Zr_{(2-a-b-o-d-e)}Ta_aNb_bGd_cTe_dW_eO_{12}$, $Li_7La_{(3-m-n)}Ce_mSr_nZr_2O_{12}$, $Li_{1.4}Al_{0.4}Ti_{1.6}(PO_4)_3$, or a combination thereof, wherein a, b, c, d and e are each independently from 0.20 to 0.60, and m and n are each independently from 0.10 to 0.50, and x, y and z are each independently from 0.10 to 0.40.

8. The composite cathode of claim 6, wherein the plasticized polymer comprises poly(methyl methacrylate), polymethylacrylate, poly(acrylic acid), or a combination thereof.

9. The composite cathode of claim 6, wherein the adhesive polymer comprises polyvinylidene difluoride, poly(vinylidene fluoride)-co-hexafluoropropylene, polyvinyl alcohol, polylactic acid, polyethylene glycol, or a combination thereof.

10. The composite cathode of claim 6, wherein the lithium salt comprises lithium fluoride, lithium bis(fluorosulfonyl) imide, lithium bis(trifluoromethanesulfonyl)imide, lithium bis(pentafluoroethanesulfonyl)imide, lithium bis(oxalato) borate, or a combination thereof.

11. The composite cathode of claim 1, wherein a thickness of the cathode sheet is in a range from 1 μm to 500 μm.

12. The composite cathode of claim 1, wherein a thickness of the interface layer is in a range from 0.1 μm to 1 μm.

13. The composite cathode of claim 1, wherein a thickness of the solid electrolyte layer is in a range from 1 μm to 50 μm.

14. The composite cathode of claim 1, wherein when the ion conductor is disposed between the cathode sheet and the interface layer, the ion conductor has a thickness in a range from 0.1 m to 1 μm.

15. The composite cathode of claim 1, wherein when the ion conductor is dispersed in the cathode sheet and the interface layer, the ion conductor has a concentration in a range from 0.01 M to 10 M.

16. A solid-state battery, comprising:
a composite cathode comprising:
a composite layer, comprising:
a cathode sheet;
an interface layer, disposed on the cathode sheet; and
an ion conductor, disposed between the cathode sheet and the interface layer, or dispersed in the cathode sheet and the interface layer, wherein the ion conductor comprises an ionic liquid, which comprises 1-ethyl-2,3- trimethyleneimidazolium bis(trifluoromethanesulfo-nyl)imide, 1-propyl-3-methylimidazolium bis(trifluoromethylsulfonyllimide, N-methyl-N-propylpiperidinium bis(trifluoromethanesulfonyl)imide, N-butyl-N-methyl pyrrolidinium bis (trifluoromethanesulfonyl)-N-cyanoamide, 1,2-dimethyl-3-propylimidazolium bis (trifluoromethanesulfonyl)imide, or a combination thereof; and a solid electrolyte layer disposed on the interface layer of the composite layer; and an anode disposed on the solid electrolyte layer of the composite cathode and electrically connected to the composite cathode by a circuit.

* * * * *